United States Patent
Jeong et al.

(10) Patent No.: US 8,582,657 B2
(45) Date of Patent: Nov. 12, 2013

(54) MULTI-DIMENSIONAL AND MULTI-STAGE TRANSFORMING APPARATUS AND METHOD

(75) Inventors: Se-Yoon Jeong, Daejon (KR); Hae-Chul Choi, Daejon (KR); Jeong-Il Seo, Daejon (KR); Seung-Kwon Beack, Seoul (KR); In-Seon Jang, Gyeonggi-do (KR); Jae-Gon Kim, Daejon (KR); Kyung-Ae Moon, Daejon (KR); Dae-Young Jang, Daejon (KR); Jin-Woo Hong, Daejon (KR); Jin-Woong Kim, Daejon (KR); Chang-Beom Ahn, Seoul (KR); Seoung-Jun Oh, Gyeonggi-do (KR); Dong-Gyu Sim, Seoul (KR); Ho-Chong Park, Gyeonggi-do (KR); Yung-Lyul Lee, Seoul (KR); Su-Yeol Jeon, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 686 days.

(21) Appl. No.: 12/307,408
(22) PCT Filed: Feb. 22, 2007
(86) PCT No.: PCT/KR2007/000927
§ 371 (c)(1),
(2), (4) Date: Oct. 7, 2009
(87) PCT Pub. No.: WO2008/004742
PCT Pub. Date: Jan. 10, 2008

(65) Prior Publication Data
US 2010/0046613 A1 Feb. 25, 2010

(30) Foreign Application Priority Data
Jul. 6, 2006 (KR) .................. 10-2006-0063623
Sep. 29, 2006 (KR) .................. 10-2006-0095786

(51) Int. Cl.
H04N 7/12 (2006.01)
H04N 11/02 (2006.01)
H04N 11/04 (2006.01)

(52) U.S. Cl.
USPC .............. 375/240.2; 375/240.18; 382/248; 382/250; 348/395.1; 348/400.1; 348/403.1

(58) Field of Classification Search
USPC ............ 375/240.01–247; 382/238, 261, 278, 382/251, 248, 250, 277, 280, 281; 708/400–405, 820; 358/426.14; 348/395.1, 400.1, 403.1, 408.1, 580; 386/328, 355
See application file for complete search history.

(56) References Cited

U.S. PATENT DOCUMENTS
5,126,962 A * 6/1992 Chiang ..................... 708/401
(Continued)

FOREIGN PATENT DOCUMENTS
JP 07-084999 A 3/1995
(Continued)

OTHER PUBLICATIONS
International Search Report; mailed Jun. 11, 2007; PCT/KR2007/000927.

Primary Examiner — Sath V Perungavoor
Assistant Examiner — Nathnael Aynalem
(74) Attorney, Agent, or Firm — Ladas & Parry LLP

(57) ABSTRACT

Provided are an apparatus for multi-stage transforming a plurality of unit blocks in multi-dimension that can improve compression efficiency of video data by collecting Discrete Cosine Transforming (DCT) coefficients of neighboring blocks and performing an additional transformation based on the DCT coefficients of an original picture and a differential picture. The method includes the steps of: performing a Discrete Cosine Transform (DCT) on inputted picture data and selecting R blocks of a predetermined size from DCT picture data, where R is a natural number equal to or greater than 2; arranging DCT coefficients of each of the selected R blocks according to each frequency in one-dimension; and performing one-dimensional transformation again on the DCT coefficients arranged in one-dimension.

6 Claims, 4 Drawing Sheets

(56) References Cited

U.S. PATENT DOCUMENTS

| | | | |
|---|---|---|---|
| 5,289,289 A * | 2/1994 | Nagasaki | 382/251 |
| 5,333,211 A * | 7/1994 | Kanda et al. | 382/261 |
| 5,452,104 A * | 9/1995 | Lee | 358/426.14 |
| 5,724,096 A * | 3/1998 | Yoon | 348/403.1 |
| 7,263,232 B2 * | 8/2007 | Srinivasan | 382/238 |
| 7,471,850 B2 * | 12/2008 | Srinivasan | 382/276 |
| 2008/0232475 A1 * | 9/2008 | Handley et al. | 375/240.18 |
| 2009/0080515 A1 * | 3/2009 | Nagaraj et al. | 375/240.2 |

FOREIGN PATENT DOCUMENTS

| | | |
|---|---|---|
| JP | 10-083388 A | 3/1998 |
| JP | 2000-099495 A | 4/2000 |
| KR | 1019930014490 A | 7/1993 |
| KR | 1019930015824 A | 7/1993 |
| KR | 1019940027560 A | 12/1994 |
| KR | 1019960016550 A | 5/1996 |
| KR | 1019970014350 A | 3/1997 |
| KR | 1019970057974 A | 7/1997 |
| KR | 1020000028531 A | 5/2000 |
| KR | 1020000052346 A | 8/2000 |
| KR | 1020020095013 A | 12/2002 |
| KR | 1020040023606 A | 3/2004 |
| KR | 1020060037149 A | 5/2006 |

* cited by examiner

MULTI-DIMENSIONAL AND MULTI-STAGE TRANSFORMING APPARATUS AND METHOD

TECHNICAL FIELD

The present invention relates to a multi-dimensional and multi-stage transforming apparatus and a method thereof; and, more particularly, to a multi-dimensional and multi-stage transforming apparatus that can improve efficiency of motion compensated prediction by using small blocks and utility of spatial correlation relatively decreased due to the small blocks by arranging coefficients transformed on a block basis according to each frequency and applying an additional multi-dimensional transformation to the arranged coefficients, and a method thereof.

BACKGROUND ART

In conventional encoding and decoding methods for compressing and decompressing video data, a Discrete Cosine Transform (DCT) is applied to encoding of an original picture or a differential picture effectively after performing intra prediction or motion compensated prediction (MCP) onto blocks of a predetermined size. Here, as the block size becomes small, the efficiency of MCP is improved but utility of spatial correlation is decreased. As the block size becomes large, the utility of the spatial correlation can be improved, but prediction errors are relatively increased in the MCP.

DISCLOSURE

Technical Problem

An embodiment of the present invention is directed to providing an apparatus and method for increasing motion compensated prediction efficiency by using small blocks to improve a compression efficiency of video data, which use block-based DCT coefficients of an original picture or a differential picture, and improving a utility of a spatial frequency by arranging the block-based DCT coefficients in a predetermined form according to each frequency and performing an additional multi-dimensional transformation to effectively use the spatial correlation, which become relatively decreased by the use of small blocks. In short, the embodiment of the present invention provides a multi-dimensional and multi-stage transforming apparatus and method which can improve the compression efficiency by collecting the DCT coefficients of neighboring blocks and performing additional transformation.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for multi-stage transforming a plurality of unit blocks arranged in multi-dimension, including the steps of: performing a Discrete Cosine Transform (DCT) on inputted picture data and selecting R blocks of a predetermined size from DCT picture data, where R is a natural number equal to or greater than 2; arranging DCT coefficients of each of the selected R blocks according to each frequency in one-dimension; and performing one-dimensional transformation again on the DCT coefficients arranged in one-dimension.

In accordance with another aspect of the present invention, there is provided a method for multi-stage transforming a plurality of unit blocks arranged in multi-dimension, including the steps of: performing a on inputted picture data and selecting U×V blocks of a predetermined size from DCT picture data, where U and V are natural numbers equal to or grater than 2; arranging DCT coefficients of the selected U×V blocks according to each frequency in two-dimension; and performing two-dimensional transforming again on the DCT coefficients arranged in two-dimension.

In accordance with another aspect of the present invention, there is provided an apparatus for multi-stage transforming a plurality of unit blocks arranged in multi-dimension, including: a block selecting unit for performing a DCT on inputted picture data and selecting R blocks of a predetermined size from DCT picture data, where R is a natural number equal to or greater than 2; a DCT coefficient arrangement unit for arranging DCT coefficients of each of the selected R blocks according to each frequency in one-dimension; and a transformation unit for performing two-dimensional transforming again on the two-dimensionally arranged DCT coefficients.

In accordance with another aspect of the present invention, there is provided an apparatus for multi-stage transforming a plurality of unit blocks arranged in multi-dimension, including: a block selecting unit for performing a DCT on inputted picture data and selecting U×V blocks of a predetermined size from DCT picture data, where U and V are natural numbers equal to or grater than 2; a DCT coefficient arrangement unit for arranging DCT coefficients of each of the selected U×V blocks according to each frequency in two-dimension; and a transformation unit for performing two-dimensional transforming again on the DCT coefficients arranged in two-dimension.

In accordance with another aspect of the present invention, there is provided a method for multi-stage restoring a picture obtained by transforming a plurality of unit blocks in multi-dimension, including the steps of: performing an Inverse Discrete Cosine Transform (IDCT) on picture data obtained from multi-dimensional and multi-stage transformation and acquiring IDCT coefficients arranged in two-dimensional; rearranging the IDCT coefficients of each frequency arranged in two-dimension; and performing the IDCT again on the rearranged IDCT coefficients.

The present invention suggests a method and an apparatus for reconstructing a plurality of P×Q blocks in multi-dimensional and performing multi-dimensional transformation on the P×Q blocks of an original picture or differential picture in an encoder for encoding picture data.

In addition, in the present invention, as the size of P×Q blocks becomes small, motion compensated prediction (MCP) becomes effective and an error of the differential picture is decreased but utility of spatial correlation is decreased. The present invention improves coding efficiency of the MCP by using the P×Q blocks of a small size and suggests a multi-dimensional reconstruction of the plurality of the P×Q blocks and multi-dimensional transformation method in order to increase the utility of the spatial correlation. As a result of using the multi-dimensional transformation method, a compression efficiency of energy is improved then the conventional 2-D compression method.

The present invention related to an encoding and a decoding for compressing and decompressing video data, intra prediction or the MCP is performed onto blocks of a predetermined size, and the DCT is applied to the blocks of a predetermined size in order to encode an original picture and a differential picture efficiently. Here, as block size becomes small, the MCP becomes effective but utility of spatial correlation is decreased. On the contrary, as the block size becomes large, the utility of the spatial correlation can be improved, but prediction errors are relatively increased in the MCP. The present invention improves an efficiency of coding by solving this problem, and the present invention provides an apparatus and method for improving utility of a spatial frequency and efficiency of MCP by using small blocks and utility of spatial correlation relatively decreased due to the small blocks by arranging DCT coefficients of each block according to each frequency and applying an additional multi-dimensional transformation to the arranged DCT coefficients.

A video compression is a core technology of a multimedia application. Video signals have many redundant information in a spatial axis and a time axis. Here, the video compression performs compression without information loss by eliminating redundancy of the video signals. For video compression, recommended methods such as H.264 and MPEG-4 AVC established by international standardization organization are widely used.

According to H.264 standard suggested for encoding and decoding of moving picture data, most of video coding is performed by a predetermined size block. After performing intra prediction for eliminating spatial redundancy and MCP for eliminating timely redundancy, DCT is performed onto a difference between an original picture and prediction picture. When the block size becomes small for increasing efficiency of the MCP, i.e., 4×4, correlation between the DCT coefficients of neighboring blocks exists. The present invention suggests an additional elimination of the spatial correlation by rearranging the DCT coefficients of neighboring blocks and applying an additional DCT to the DCT coefficients. Through the suggested multi-dimensional and multi-stage transforming method, compression of coding is improved by increasing compression efficiency of energy of the DCT coefficients.

The present invention improves the compression efficiency of video data by collecting DCT coefficients of neighboring blocks and performing an additional transformation based on the DCT coefficients of an original picture and a differential picture. Particularly, when the block size is small to improve efficiency of the MCP, residue correlation between neighboring blocks is high. Thus, the energy compression efficiency suggested in the present invention becomes high.

The present invention can improve the energy compression efficiency by using a multi-dimensional and multi-stage transformation method better than a conventional 2-D transformation method, and coding performance can be improved adopting this method. A transformation-based coding method adopted by most international standards these days includes the MCP, a transformation, a quantization and an entropy coding. If the MCP is performed precisely by using the small blocks, and the spatial correlation is eliminated by using the multi-dimensional and multi-stage transforming method of the present invention, signals to be encoded become random signals without temporal and spatial correlations. Therefore, performance of entire coding is determined based on performance of the transformation method. In addition, a coding algorithm can be simplified and context for utilizing the spatial correlation in entropy coding by effectively using the spatial correlation based on the additional multi-dimensional and multi-stage transforming method.

Advantageous Effects

The present invention can improve compression efficiency of energy through a multi-dimensional and multi-stage transformation method better than a conventional 2-D transformation method and performance of coding method adopting this method can be improved.

In addition, the present invention eliminates a spatial correlation by using the multi-dimensional and multi-stage so that signals to be encoded become random signals without temporal and spatial correlations.

Moreover, a coding algorithm can be simplified and context for utilizing the spatial correlation in entropy coding by effectively using the spatial correlation based on the additional multi-dimensional and multi-stage transforming method.

BEST MODE FOR THE INVENTION

The advantages, features and aspects of the invention will become apparent from the following description of the embodiments with reference to the accompanying drawings, which is set forth hereinafter. Also, when it is considered that detailed description on a related art may obscure the points of the present invention unnecessarily in describing the present invention, the description will not be provided herein. Hereinafter, specific embodiments of the present invention will be described with reference to the accompanying drawings.

Figure 1:
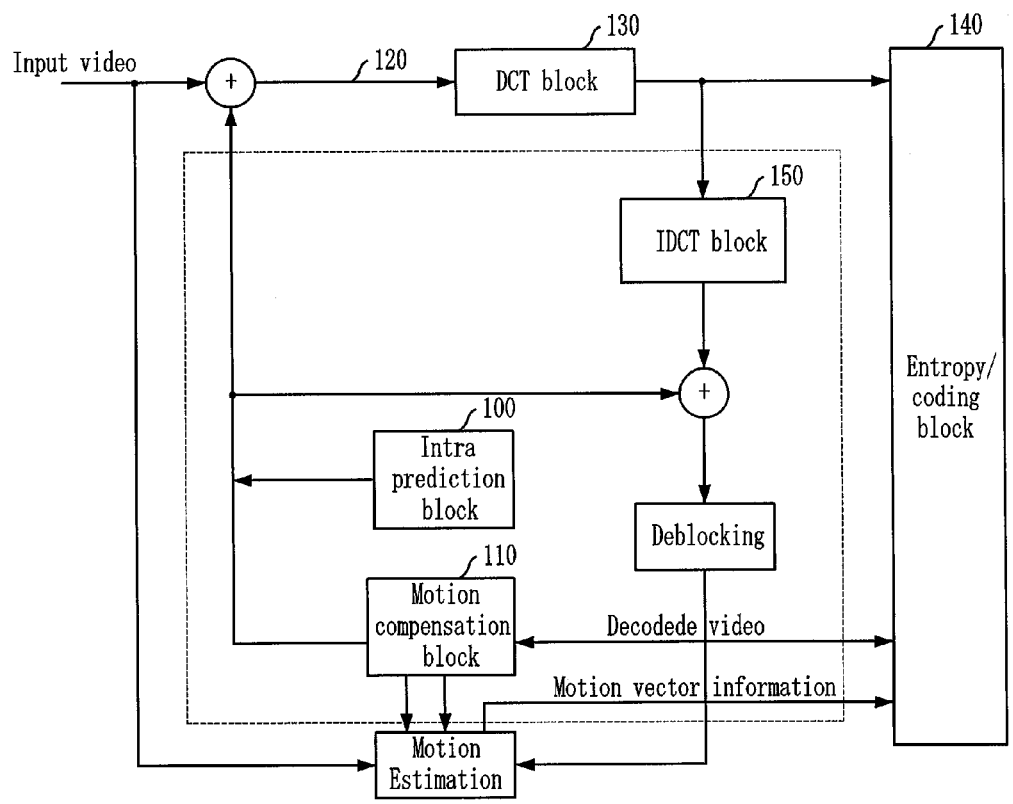
FIG. 1 is a block diagram illustrating a video encoding apparatus to which the present invention is applied.

FIG. 1 is a block diagram illustrating a video encoding apparatus to which the present invention is applied.

As shown in FIG. 1, a differential picture 120 is generated through an intra prediction block 100 or a motion compensation block 110 for encoding blocks of a predetermined size, e.g., 4×4 blocks, of an inputted current picture. The differential picture 120 is transmitted passing through a Discrete Cosine Transform (DCT) block 130 (the DCT block further performs quantization) and an entropy coding block 140. If transformed coefficients pass through the DCT block 130, where quantization occurs, and an Inverse Discrete Cosine Transform (IDCT) block 150, where dequantization also occurs, a picture to be acquired in a receiver is reconstructed and the picture is used in a motion estimation block.

The present invention is about the DCT block 130 and the IDCT block 150 and suggests a multi-dimensional and multi-stage transforming method in order to improve efficiency of the conventional 2D transforming method. The DCT block 130 performs a 2D transformation and a first transformation, and frequency elements are arranged according to each frequency of 2D transformed data. Then, an additional transformation, which is a second transformation, is applied to the arranged 2D transformed data. In the IDCT block 150, a first inverse transformation to the second transformation is performed. Blocks are rearranged, and a second inverse transformation of the first transformation is performed.

Figure 2:
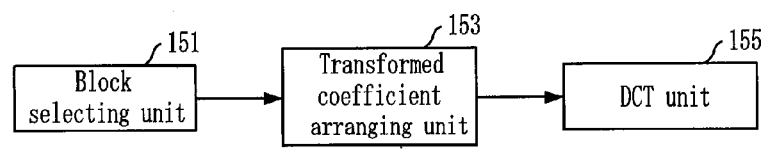
FIG. 2 is a diagram illustrating a multi-dimensional and multi-stage transforming apparatus in accordance with an embodiment of the present invention.

FIG. 2 is a diagram illustrating a multi-dimensional and multi-stage transforming apparatus in accordance with an embodiment of the present invention. FIG. 2 is a diagram illustrating the DCT block of FIG. 1. As shown in FIG. 2, the DCT block 130 includes a block selecting unit 151, a transformed coefficient arranging unit 153 and a DCT unit 155. The block selecting unit 151 selects blocks of a predetermined size from the 2D transformed picture data. The transformed coefficient arranging unit 153 arranges the transformed coefficients having the same frequency according to a predetermined way. The DCT unit 155 re-transforms the arranged transformed coefficients.

Figure 3:
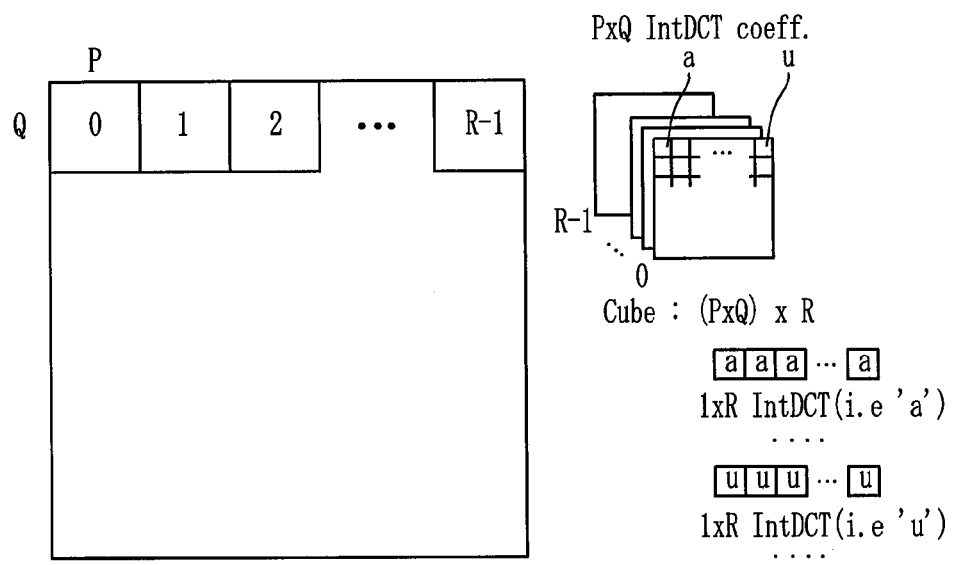
FIG. 3 is a diagram showing a process of selecting R 2D P×Q blocks and arranging the selected R 2D transformed P×Q blocks in one-dimension (1×R) according to each frequency in accordance with an embodiment of the present invention.

FIG. 3 is a diagram showing a process of selecting R 2D transformed P×Q blocks and arranging the selected R 2D transformed P×Q blocks in one-dimension (1×R) according to each frequency in accordance with an embodiment of the present invention. Hereinafter, this process is called '3D DCT' for the sake of convenience.

Referring to FIG. 3, the block selecting unit 151 performs the DCT transformation onto inputted picture data and selects R DCT transformed blocks of a predetermined size. Here, R is a natural number grater than 2. Then, the transformed coefficient arranging unit 153 arranges the transformed coefficients of the same frequency in each R block in one-dimension. Then, the DCT unit 155 transforms the 1D arranged coefficients obtained from one-dimensional transformation, to thereby perform the 3DCT. In FIG. 3, a transformed coefficient 'a' represents a dc component corresponding to (0, 0) location in the P×Q block. The dc components acquired from R P×Q blocks are arranged in a row, and the 1D transformation is applied to the dc components.

Figure 4:
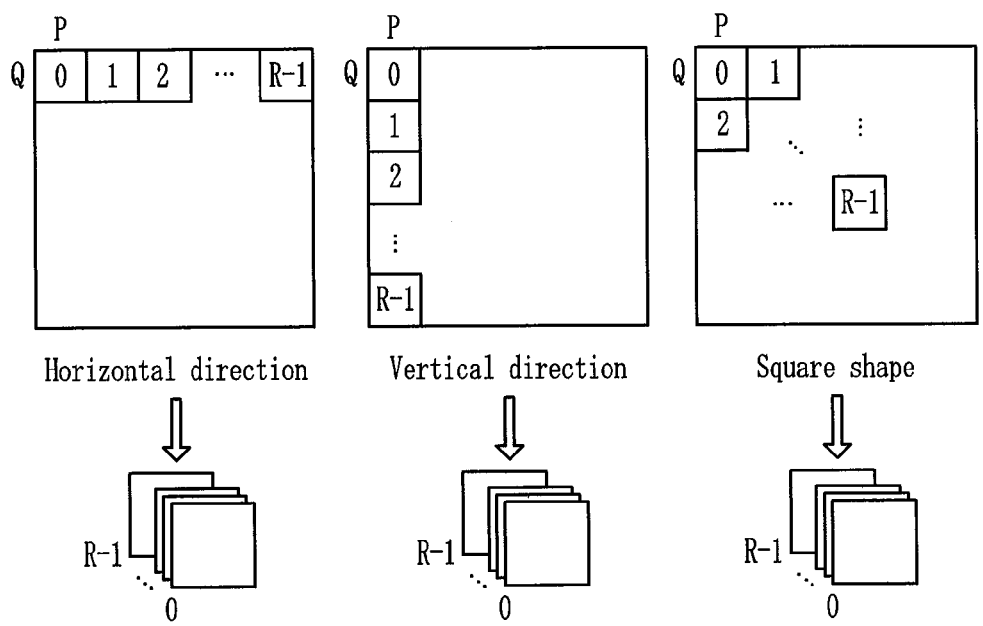
FIG. 4 is a diagram showing an example of selecting R P×Q blocks for arrangement of FIG. 2.

FIG. 4 is a diagram showing an example of selecting R P×Q blocks for arrangement of FIG. 2. As shown in FIG. 4, R P×Q blocks selected based on a horizontal direction or a vertical direction or a square shape.

Figure 5:
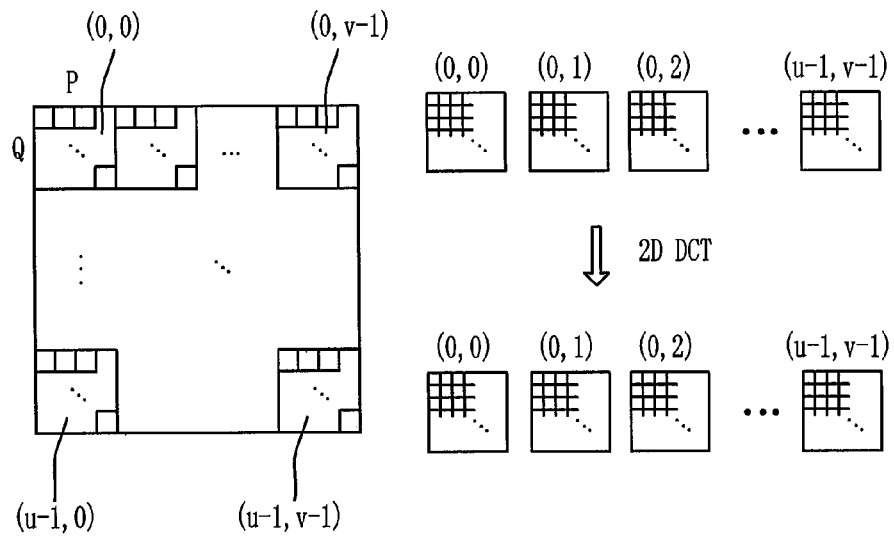
FIG. 5 is a diagram showing a transformation process of selecting U×V 2D transformed P×Q blocks and arranging the selected U×V 2D transformed P×Q blocks in two-dimension (U×V) according to each frequency in accordance with an embodiment of the present invention.

FIG. 5 is a diagram showing a transformation process of selecting U×V 2D transformed P×Q blocks and arranging the selected U×V 2D transformed P×Q blocks in two-dimension (U×V) according to each frequency in accordance with an embodiment of the present invention.

Referring to FIG. 5, the block selecting unit 151 performs the DCT transformation onto inputted picture data and selects U×V DCT transformed blocks of a predetermined size. Here, U and V are natural numbers grater than 2. Then, the transformed coefficient arranging unit 153 arranges the transformed coefficients of the same frequency in each of the U×V blocks in two-dimension. Then, the DCT unit 155 transforms the transformed coefficients arranged in two-dimension two dimensionally, to thereby perform the 4D DCT.

As described above referring to FIGS. 3 and 5, the multi-dimensional transformation of the present invention is a process of applying the 2D transformation in a first stage, rearranging to the 2D transformed data according to each frequency, and performing 1D transformation or more than 1D transformation in a second stage, to thereby realize transformation higher than three dimensions. The multi-stage transformation implements the multi-dimensional transformation by integrating the 2D transformation or the 1D transformation of multiple stages. When the size of P×Q blocks is small relatively, it is quite probable that the same frequency elements of neighboring blocks have similar values. Therefore, compression efficiency can be improved by arranging transforming coefficients of the neighboring blocks according to each frequency and performing additional transformation.

Figure 6:
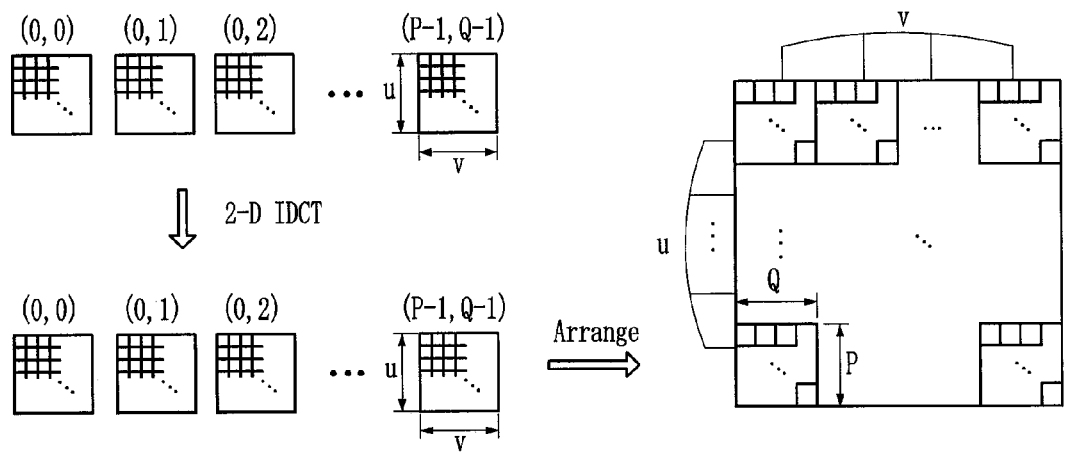
FIG. 6 is a diagram showing an inverse transformation process of selecting P×Q 4D transformed U×V blocks and rearranging frequency data by applying 2D IDCT to 2D P×Q blocks in accordance with an embodiment of the present invention.

FIG. 6 is a diagram showing an inverse transformation process of selecting P×Q 4D transformed U×V blocks and rearranging frequency data by applying 2D IDCT to 2D P×Q blocks in accordance with an embodiment of the present invention. The restoration process of the picture multi-dimensional and multi-stage transformed is performed in opposition to the process described referring to FIGS. 3 and 5. That is, a mathematically defined U×V IDCT is applied to encoded data (left and top of FIG. 6), and P×Q data (left and bottom of FIG. 6) according to each frequency are acquired. Frequency data are arranged in neighboring blocks according in opposition to the arrangement way of encoder (the DCT block), to thereby generate U×V P×Q blocks shown in right side of FIG. 6. The 2D IDCT (P×Q) is applied to the rearranged data, and the restoration picture is acquired.

Figure 7:
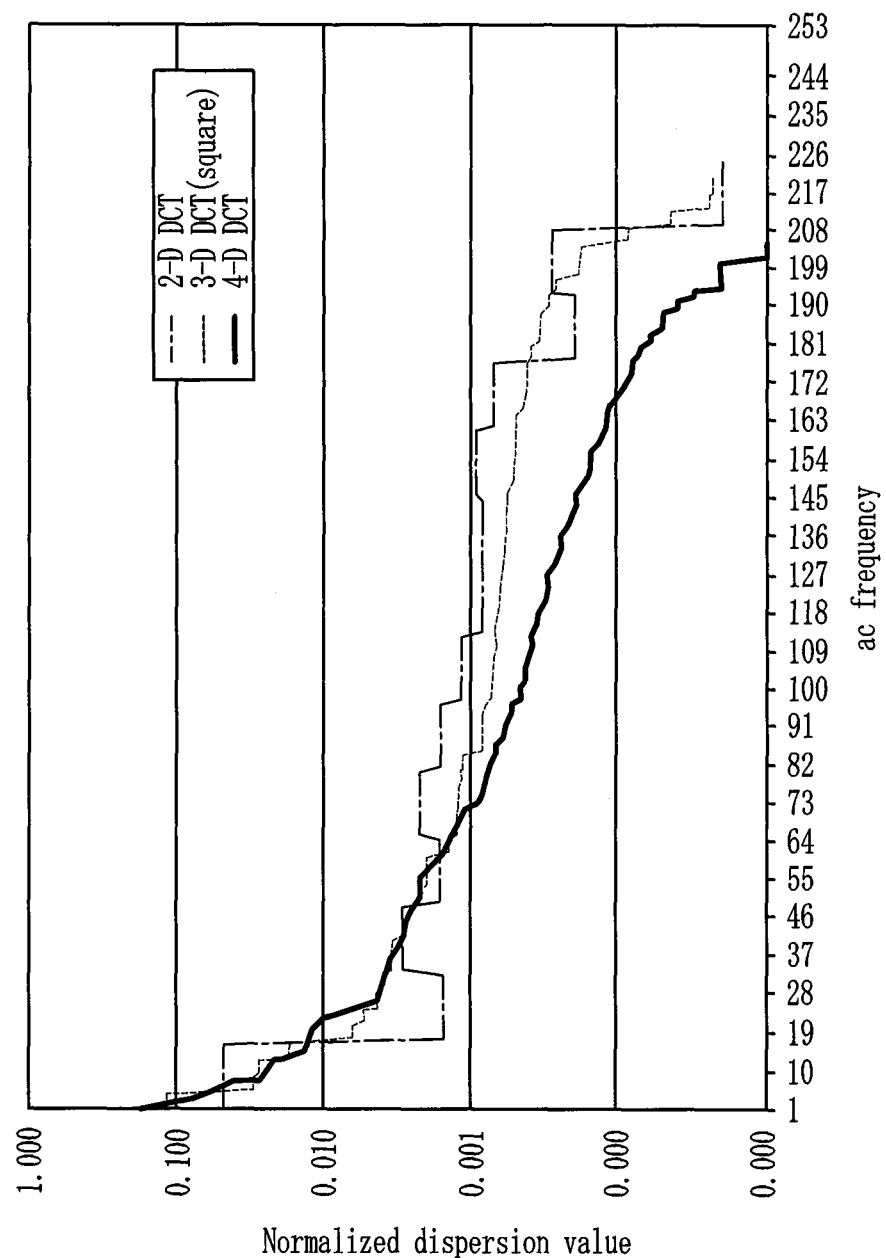
FIG. 7 is a graph showing normalized dispersion of DCT coefficients obtained by applying a conventional transformation method 2D and the present invention, 3D and 4D, to a 'Foreman' video sequence to examine the energy compression efficiency.

FIG. 7 is a graph showing normalized dispersion of DCT coefficients obtained by applying a conventional transformation method 2D and the present invention, 3D and 4D, to a 'Foreman' video sequence to examine the energy compression efficiency.

Herein, the horizontal axis represents ac frequency in log scale and the vertical axis represents normalized dispersions of each DCT coefficients to the 'Foreman' video sequence. In FIG. 7, P=Q=U=V=R=4.

Since characteristics of DCT coefficients for each dimension cannot be compared with each other directly, coding efficiencies are compared. That is, when 4D DCT, U×V P×Q blocks are coded. When 3D DCT, U P×Q blocks are coded. When the conventional 2D DCT, P×Q blocks are coded.

That is, in order to transmit video data of the same size, P×Q×U×V transforming coefficients are coded once in case of the 4D DCT. In case of the 3D DCT, P×Q×U transforming coefficients are coded V times repeatedly. In case of the 2D DCT, P×Q transforming coefficients are coded U×V times repeatedly. Therefore, FIG. 7 represents the normalized dispersion of P×Q×U×V coefficients considering repeated coding. Moreover, flat sections of 2D and 3D graphs represent the same statistical characteristics of the repeated coding.

As the energy compression efficiency becomes high, the graph moves down-wardly. 4D DCT and 3D DCT suggest in the present invention have a higher compression efficiency of the energy than a conventional 2D DCT.

Hereinafter, performance improvement result of an embodiment will be described in detail.

The energy compression efficiency of the multi-dimensional and multi-state transformation method of the present invention is examined based on a recommended picture in H.264. JM 9.5 Encoder Baseline Profile is used as H.264 codec. The compression efficiency of energy is determined assuming that each frequency elements are independent. Examination conditions are described in Table 1.

TABLE 1

|  | Foreman (CIF) | Harbour (CIF) | Coastguard (CIF) | Container (CIF) |
|---|---|---|---|---|
| Total Frame | 300 (30 Hz) | 300 (30 Hz) | 300 (30 Hz) | 300 (30 Hz) |

Used codec: JM 9.4 Encoder Baseline Profile

In Table 2, when the conventional H.264 2D DCT and the 3D DCT and 4D DCT suggested in the present invention are applied to each video sequence, the number of frequency elements whose accumulation value of the normalized dispersion reach 90%, 95%, 99% of the total energy.

When relative small frequency elements can represent most of the total energy, the compression efficiency of the energy is high. As described in Table 2, the 3D DCT and 4D DCT suggested in the present invention include most of the total energy with a smaller number of frequency elements than the conventional 2D DCT method. For example, in order to present 90% of the total energy for the 'Foreman' case, 84 frequency elements are needed in case of conventional 2D used in H. 264; 95 frequency elements are needed in case of 3D; and only 41 frequency elements are needed in case of 4D. In addition, in order to present 95% of the total energy, 126 frequency elements are needed in case of conventional 2D; 106 frequency elements are needed in case of 3D; and only 63 frequency elements are needed in case of 4D. The compression efficiency of energy is connected directly with a compression efficiency of coding. Therefore, the multi-dimensional and multi-stage transformation method suggested in the present invention has excellent compression efficiency of energy than the conventional 2D method. In addition, if this method is adopted, performance is respectively improved better than the conventional coding.

TABLE 2

|  | 90% | 95% | 99% |
|---|---|---|---|
| Foreman | | | |
| 2D | 84 | 126 | 173 |
| 3D | 59 | 106 | 177 |
| 4D | 41 | 63 | 125 |
| Harbour | | | |
| 2D | 41 | 74 | 116 |
| 3D | 30 | 59 | 125 |
| 4D | 29 | 50 | 106 |
| Coastguard | | | |
| 2D | 51 | 85 | 139 |
| 3D | 50 | 87 | 157 |
| 4D | 37 | 60 | 116 |
| Container | | | |
| 2D | 90 | 120 | 158 |
| 3D | 74 | 109 | 162 |
| 4D | 51 | 79 | 137 |

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application Nos. 2006-0063623 and 2006-0095786, filed with the Korean Intellectual Property Office on Jul. 6, 2006, and Sep. 29, 2006, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for multi-stage transforming a plurality of unit blocks arranged in multi-dimension, comprising the steps of:
performing a Discrete Cosine Transform (DCT) on inputted picture data to provide DCT transformed picture data having a plurality of DCT transformed picture data blocks, wherein each of the plurality of DCT transformed picture data blocks is comprised of DCT coefficients, each corresponding to a respective frequency;
selecting R blocks of the plurality of DCT transformed picture data blocks, where R is a natural number equal to or greater than 2;
arranging DCT coefficients of each of the selected R blocks according to each frequency in one-dimension, wherein respective DCT coefficients of the same frequency components in the R blocks are arranged in one-dimension; and
performing a one-dimensional transformation on DCT coefficients of the same frequency that have been arranged in one-dimension.

2. The method of claim 1, wherein the R blocks are selected in a horizontal direction.

3. The method of claim 1, wherein the R blocks are selected in a vertical direction.

4. The method of claim 1, wherein the R blocks are selected in a diagonal direction.

5. A method for multi-stage restoring a picture obtained by transforming a plurality of unit blocks in multi-dimension, comprising the steps of:
performing an Inverse Discrete Cosine Transform (IDCT) on picture data obtained from multi-dimensional and multi-stage transformation and acquiring IDCT coefficients, arranged in two-dimensional for same frequency components;
rearranging the IDCT coefficients of each frequency arranged in two-dimension from respective DCT coefficients of the same frequency components arranged in one-dimension to DCT transformed picture data having a plurality of DCT transformed picture data blocks, wherein each of the plurality of DCT transformed picture data blocks is comprised of a plurality of DCT coefficients, each corresponding to a respective frequency; and
performing the IDCT again on the rearranged IDCT coefficients.

6. An apparatus for multi-stage restoring a picture obtained by transforming a plurality of unit blocks in multi-dimension, comprising:
an IDCT coefficient acquisition means for performing an Inverse Discrete Cosine Transform (IDCT) on multi-dimensional and multi-stage transformed picture data and acquiring IDCT coefficients, arranged in two-dimension for same frequency components;
an IDCT rearrangement means for rearranging the IDCT coefficients of each frequency arranged in two-dimension from respective DCT coefficients of the same frequency components arranged in one-dimension to DCT transformed picture data having a plurality of DCT transformed picture data blocks, wherein each of the plurality of DCT transformed picture data blocks is comprised of a plurality of DCT coefficients, each corresponding to a respective frequency; and an inverses transformation means for performing the IDCT again on the rearranged IDCT coefficients.

* * * * *